US011492536B2

(12) United States Patent
Alkhalaf et al.

(10) Patent No.: US 11,492,536 B2
(45) Date of Patent: Nov. 8, 2022

(54) CEMENT SLURRIES AND METHODS FOR CEMENTING A CASING IN A WELLBORE

(71) Applicant: Saudi Arabian Oil Company, Dhahran (SA)

(72) Inventors: Sara A. Alkhalaf, Alkhobar (SA); Abdullah S. Al-Yami, Dhahran (SA); Vikrant Wagle, Dhahran (SA); Abdulaziz Ibrahim Alhelal, Alhasa (SA); Ali Mohammed Alsafran, Doha (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/176,453

(22) Filed: Feb. 16, 2021

(65) Prior Publication Data

US 2022/0259482 A1 Aug. 18, 2022

(51) Int. Cl.
*C09K 8/467* (2006.01)
*C04B 28/04* (2006.01)
(Continued)

(52) U.S. Cl.
CPC .............. *C09K 8/467* (2013.01); *C04B 24/28* (2013.01); *C04B 28/04* (2013.01); *E21B 33/14* (2013.01);
(Continued)

(58) Field of Classification Search
CPC .... C09K 8/467; C09K 2208/12; C04B 24/28; C04B 28/04; C04B 2201/20; E21B 33/14
See application file for complete search history.

(56) References Cited

U.S. PATENT DOCUMENTS 2,761,843 A 9/1956 Brown
2,873,251 A 2/1959 Jones, Jr.
(Continued)

FOREIGN PATENT DOCUMENTS

WO 2014123709 A1 8/2014
WO 2014200671 A2 12/2014
WO 2015031270 A1 3/2015

OTHER PUBLICATIONS

U.S. Office Action dated Sep. 29, 2021 pertaining to U.S. Appl. No. 17/176,434, filed Feb. 16, 2021, 21 pages.
(Continued)

*Primary Examiner* — Crystal J. Lee
(74) *Attorney, Agent, or Firm* — Dinsmore & Shohl LLP (57) ABSTRACT

According to one or more embodiments of the present disclosure, a cement slurry includes cement particles, an aqueous fluid in an amount of from 10 wt. % to 70 wt. % relative to the total weight of the cement particles, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 wt. % to 10 wt. % relative to the total weight of the cement particles. The average molecular weight of the polyethylene polyamines in the cement slurry having the first chemical structure may be from 200 g/mol to 400 g/mol. All of the polyethylene polyamines in the cement slurry having the first chemical structure may be encompassed in the clay stabilizer. Methods for cementing a casing in a wellbore using the cement slurry are also disclosed.

20 Claims, 1 Drawing Sheet

(51) Int. Cl.
   *E21B 33/14* (2006.01)
   *C04B 24/28* (2006.01)

(52) U.S. Cl.
   CPC ...... *C04B 2201/20* (2013.01); *C09K 2208/12* (2013.01)

(56) References Cited

U.S. PATENT DOCUMENTS

| | | | |
|---|---|---|---|
| 4,493,771 A | 1/1985 | Wilson et al. | |
| 4,515,708 A | 5/1985 | Haslegrave et al. | |
| 5,057,467 A | 10/1991 | Croft | |
| 5,558,171 A | 9/1996 | McGlothlin et al. | |
| 5,593,953 A | 1/1997 | Malchow, Jr. | |
| 5,641,385 A | 6/1997 | Croft et al. | |
| 5,964,295 A | 10/1999 | Brown et al. | |
| 6,153,049 A | 11/2000 | Croft | |
| 6,312,560 B1 | 11/2001 | Croft | |
| 7,863,228 B2 | 1/2011 | Loper et al. | |
| 9,434,911 B2 | 9/2016 | Bennett et al. | |
| 9,631,131 B2 | 4/2017 | Witham et al. | |
| 2006/0128571 A1 | 6/2006 | Loper | |
| 2009/0131280 A1 | 5/2009 | Federici et al. | |
| 2010/0096130 A1 | 4/2010 | Parlar et al. | |
| 2014/0262319 A1 | 9/2014 | Treybig et al. | |
| 2015/0065614 A1* | 3/2015 | Kuo | C04B 24/2652 524/4 |
| 2015/0072902 A1 | 3/2015 | Lafitte et al. | |
| 2016/0208158 A1 | 7/2016 | Monahan et al. | |
| 2018/0127557 A1 | 5/2018 | Reddy et al. | |
| 2018/0171198 A1* | 6/2018 | Mack | C09K 8/86 |
| 2019/0136110 A1 | 5/2019 | Albahrani et al. | |
| 2020/0071602 A1* | 3/2020 | Dhawan | C04B 24/123 |
| 2020/0115615 A1 | 4/2020 | Steves et al. | |

OTHER PUBLICATIONS

U.S. Office Action dated Mar. 7, 2022 pertaining to U.S. Appl. No. 17/176,449, filed Feb. 16, 2021, 26 pages.

U.S. Office Action dated Mar. 30, 2022 pertaining to U.S. Appl. No. 17/176,434, filed Feb. 16, 2021, 20 pages.

* cited by examiner

CEMENT SLURRIES AND METHODS FOR CEMENTING A CASING IN A WELLBORE

BACKGROUND

Field

The present disclosure relates to natural resource well drilling and, in particular, to cement slurries and methods for cementing a casing in a wellbore.

Technical Background

Cement slurries are commonly used in the oil and gas industries, and provide a number of important functions, such as supporting well integrity, supporting the vertical and radial loads applied to casings, and isolating portions of subterranean formations from wellbores. As a result of the significant variety of well locations, cement slurries must be able to consistently perform over a wide range of temperatures and conditions. If the cement slurries are unable to perform in a particular temperature or condition, the cement may fail and result in, for example, the loss of zonal isolation. Generally, the cement may fail in three primary locations: the cement-formation interface, in the bulk cement, and the cement-casing interface. One factor that may result in cement failure at the cement-formation interface is poor bonding between the cement and the formation. This is particularly common in subterranean formations that are composed primarily of clay particles, such as shale formations. The susceptibility of shale formations to hydration by water in cement slurries may result in the sloughing, also referred to as swelling, or disintegration of the shale formation. As a result, the cement may be unable to form a strong bond with the shale formation and the cement may fail.

SUMMARY

Accordingly, there is an ongoing need for improved cement slurries and methods for cementing casings in wellbores in shale formations. The embodiments of the present disclosure include a cement slurry that includes a mixture of polyethylene polyamines. The chemical structure of the polyethylene polyamines may facilitate the adsorption of the polyethylene polyamines onto the surface of clay particles present in shale formations during cementing. The adsorption of the polyethylene polyamines onto the surface of the clay particles may reduce or prevent interactions between the clay particles and the aqueous fluid of the cement slurry. This reduction or prevention of interaction may, in turn, reduce or prevent the hydration of the shale formation. As a result, the cement slurry of the present disclosure may provide a strong bond at the cement-formation interface and reduce the potential for failure of the cement job.

According to one or more embodiments of the present disclosure, a cement slurry includes cement particles, an aqueous fluid in an amount of from 10 weight percent (wt. %) to 70 wt. % relative to the total weight of the cement particles, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 wt. % to 10 wt. % relative to the total weight of the cement particles. The average molecular weight of the polyethylene polyamines in the cement slurry having the first chemical structure may be from 200 g/mol to 400 g/mol. All of the polyethylene polyamines in the cement slurry having the first chemical structure may be encompassed in the clay stabilizer.

According to one or more embodiments of the present disclosure, a method for cementing a casing in a wellbore includes pumping a cement slurry into an annulus between the casing and the wellbore, and curing the cement slurry. The cement slurry may include cement particles, an aqueous fluid in an amount of from 10 wt. % to 70 wt. % relative to the total weight of the cement particles, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 wt. % to 10 wt. % relative to the total weight of the cement particles. The average molecular weight of the polyethylene polyamines in the cement slurry having the first chemical structure may be from 200 g/mol to 400 g/mol. All of the polyethylene polyamines in the cement slurry having the first chemical structure may be encompassed in the clay stabilizer.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Reference will now be made in greater detail to various aspects, some of which are illustrated in the accompanying drawings.

DETAILED DESCRIPTION

The present disclosure is directed to cement slurries and, additionally, to methods for cementing a casing in a wellbore of a subterranean well using cement slurries. A subterranean formation is the fundamental unit of lithostratigraphy. As used in the present disclosure, the term "subterranean formation" may refer to a body of rock that is sufficiently distinctive and continuous from the surrounding rock bodies that the body of rock can be mapped as a distinct entity. A subterranean formation may be sufficiently homogenous to form a single identifiable unit containing similar geological properties throughout the subterranean formation, including, but not limited to, porosity and permeability. A single subterranean formation may include different regions, where some regions include hydrocarbons and others do not. To extract hydrocarbons from the hydrocarbon regions of the subterranean formation, production wells are drilled. The wellbore of production wells may serve to connect hydrocarbon regions of the subterranean formation to the surface and enable hydrocarbons to travel from the subterranean formation to the surface. As used in the present disclosure, the term "wellbore" may refer to the drilled hole or borehole, including the openhole or uncased portion of the well.

In order to drill a wellbore, a drill string is inserted into a pre-drilled hole and rotated to cut into the rock at the bottom of the hole, producing cuttings. Drilling fluids, also referred to as drilling muds, may be pumped down through the drill string during drilling to remove cuttings from the bottom of the wellbore. Drilling fluids may lift cuttings away from the bottom of the wellbore when recirculated back to the surface. Drilling fluids may serve a number of additional functions as well. For example, drilling fluids may also provide hydrostatic pressure in the wellbore sufficient to support the sidewalls of the wellbore. This hydrostatic pressure may prevent the sidewalls from collapsing and caving in on the drill string as well as prevent fluids present in the subterranean formation from flowing into the wellbore during drilling.

In some instances, a casing may be inserted into the wellbore. Typically, the casing is a pipe or other tubular structure that has a diameter less than that of the wellbore. Generally, the casing is lowered into the wellbore such that the bottom of the casing reaches to a region near the bottom of the wellbore. The casing may then be cemented by inserting a cement slurry into the annulus region between the outer edge of the casing and the edge of the wellbore (that is, the surface of the subterranean formation). As used in the present disclosure, the term "cement slurry" refers to a composition comprising cement particles that is mixed with at least water to form cement. The cement slurry may be inserted into the annular region by pumping the cement slurry into the interior portion of the casing, to the bottom of the casing, around the bottom of the casing, into the annular region, or combinations of these, which displaces the drilling fluid, pushing it to the top of the wellbore. Following the insertion of an appropriate amount of the cement slurry into the interior region of the casing, a displacement fluid may be utilized to push the cement slurry out of the interior region of the casing and into the annular region. This displacement may cause the drilling fluid, as well as any other fluids that may be present, to be removed from the annular region, out the top of the wellbore. The cement slurry may then be cured or otherwise allowed to harden.

Once set, the cement may provide a number of important functions, such as supporting the integrity of the wellbore, supporting the vertical and radial loads applied to the casing, and the wellbore from portions of the subterranean formation. If the cement fails, wellbore integrity and zonal isolation (that is, the isolation of the wellbore from portions of the subterranean formation) may be lost, resulting in undesirable fluid communication between the wellbore and the subterranean formation. Without being bound by any particular theory, this fluid communication may result in drilling fluid loss from the wellbore into the surrounding subsurface formation or in decreased wellbore pressure, possibly leading to a well control event. As a result, wellbore integrity and zonal isolation are critical to efficient production and use of the wellbore.

Generally, the cement may fail in three primary locations: the cement-formation interface, in the bulk cement, and the cement-casing interface. One factor that may result in cement failure at the cement-formation interface is poor bonding between the cement and the surface of the subterranean formation. This is particularly common in subterranean formations that are composed primarily of clay particles, such as shale formations. The susceptibility of shale formations to hydration by water in cement slurries may result in the sloughing, also referred to as swelling, or disintegration of the shale formation. As a result, the cement may be unable to form a strong bond with the shale formation and the cement may fail.

In one or more embodiments, the present disclosure is directed to cement slurries that may include cement particles, an aqueous fluid in an amount of from 10 wt. % to 70 wt. % relative to the total weight of the cement particles, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 wt. % to 10 wt. % relative to the total weight of the cement particles. The average molecular weight of the polyethylene polyamines in the cement slurry having the first chemical structure may be from 200 g/mol to 400 g/mol. All of the polyethylene polyamines in the cement slurry having the first chemical structure may be encompassed in the clay stabilizer. The cement slurries of the present disclosure may reduce or prevent the hydration of shale formations. The structure of the polyethylene polyamines of the cement slurry may facilitate the adsorption of the polyethylene polyamines onto the surface of clay particles present in shale formations during cementing. The adsorption of the polyethylene polyamines onto the surface of the clay particles may reduce or prevent interactions between the clay particles and the aqueous fluid of the cement slurry. This reduction or prevention of interaction may, in turn, reduce or prevent the hydration of the shale formation. As a result, the cement slurry of the present disclosure may have improved bonding at the cement-formation interface and reduce the potential of cement failure.

In one or more embodiments, the cement slurry may include cement particles. The cement particles may be any suitable material which, when mixed with water, can be cured into a cement. Suitable cement particles may include hydraulic or non-hydraulic cement particles. As used in the present disclosure, the term "hydraulic cement particles" refers to a mixture of limestone, clay, and gypsum burned together under extreme temperatures. The term "non-hydraulic cement particles" refers to a mixture of lime, gypsum, plasters, and oxychloride. Hydraulic cement particles may begin to harden instantly, or within a few minutes, while in contact with water. In contrast, non-hydraulic cement particles may take longer to harden or may require drying conditions for proper strengthening, but may be more economically feasible than hydraulic cement particles.

In one or more embodiments, the cement particles may include Portland cement, siliceous fly ash, calcareous fly ash, slag cement, silica fume, quartz, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, or combinations of these. The cement particles may be chosen based on the desired application of the cement slurry. In some embodiments, the cement particles may be Portland cement particles, such as, for example, Class G Portland cement. Portland cement particles are hydraulic cement particles (that is, cement particles that not only harden by reacting with water but also form a water-resistant product) produced by pulverizing clinkers, which contain hydraulic calcium silicates and one or more of the forms of calcium sulfate as an inter-ground addition.

In one or more embodiments, the cement slurry includes an aqueous fluid. As used in the present disclosure, the term "aqueous" may refer to a fluid or solution that includes water as the major constituent. In some embodiments, the aqueous fluid may include at least one of fresh water, salt water, brine, municipal water, formation water, produced water, well water, filtered water, distilled water, seawater, or combinations of these. The brine may include at least one of natural and synthetic brine, such as saturated brine or formate brine. Without being bound by any particular theory, it is believed that brine may be used to create osmotic balance between the cement slurry and the subterranean formation.

In one or more embodiments, the aqueous fluid may include water containing organic compounds or salt. Without being bound by any particular theory, salt or other organic compounds may be incorporated into the aqueous fluid to control the density of the cement slurry. Increasing the saturation of the aqueous fluid by increasing the salt concentration or the level of other organic compounds in the aqueous fluid may increase the density of the cement slurry. Suitable salts include but are not limited to alkali metal chlorides, hydroxides, or carboxylates. For example, in embodiments the aqueous base fluid may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations of these.

In one or more embodiments, the cement slurry includes the aqueous fluid in an amount of from 10 weight percent (wt. %) to 70 wt. % by weight of cement particles. For example the cement slurry may include the aqueous fluid in an amount of from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 70 wt. %, from 20 wt. % to 60 wt. %, from 20 wt. % to 50 wt. %, from 20 wt. % to 40 wt. %, from 20 wt. % to 30 wt. %, from 30 wt. % to 70 wt. %, from 30 wt. % to 60 wt. %, from 30 wt. % to 50 wt. %, from 30 wt. % to 40 wt. %, from 40 wt. % to 70 wt. %, from 40 wt. % to 60 wt. %, from 40 wt. % to 50 wt. %, from 50 wt. % to 70 wt. %, from 50 wt. % to 60 wt. %, or from 60 wt. % to 70 wt. % by weight of cement particles.

In one or more embodiments, the cement slurry includes a clay stabilizer. In some embodiments, the clay stabilizer includes one or more polyethylene polyamines. In embodiments, the clay stabilizer may include a substantial portion of, or even all of, the polyethylene polyamines in the cement slurry into which the clay stabilizer may be incorporated. For example, the clay stabilizer may include greater than or equal to 90.0 percent (%), greater than or equal to 95.0%, greater than or equal to 99.0%, greater than or equal to 99.5% or greater than or equal to 99.9% of the polyethylene polyamines in the cement slurry into which the clay stabilizer may be incorporated. The clay stabilizer may reduce or prevent the swelling of clay particles present in subterranean formations and the hydration of the subterranean formations. Without being bound by any particular theory, it is believed that the polyethylene polyamines are adsorbed onto the surfaces of the clay particles due to intermolecular interactions, such as hydrogen bonding and Van der Waals forces, between the surfaces of the clay particles and the amine moieties of the polyethylene polyamines. This adsorption may create a film or layer of polyethylene polyamines on the surfaces of the clay particles that prevents interactions between the clay particles and the aqueous fluid of the cement slurry that may cause swelling of the clay particles and the hydration of the subterranean formation.

In one or more embodiments, the clay stabilizer includes linear polyethylene polyamines, cyclic polyethylene polyamines, branched polyethylene polyamines, or combinations of these. Generally, the polyethylene polyamines of the clay stabilizer may have the chemical structure of Formula (I):

$$H_2NCH_2CH_2(NHCH_2CH_2)_xNH_2 \quad \text{Formula (I)}$$

In Formula (I), x may be an integer greater than or equal to 3. In some embodiments, x may be an integer greater than or equal to 4, greater than or equal to 5, greater than or equal to 6, greater than or equal to 7, greater than or equal to 8, greater than or equal to 9, greater than or equal to 10. For example, x may be an integer from 3 to 10, from 3 to 9, from 3 to 8, from 3 to 7, from 3 to 6, from 3 to 5, from 3 to 4, from 4 to 10, from 4 to 9, from 4 to 8, from 4 to 7, from 4 to 6, from 4 to 5, from 5 to 10, from 5 to 9, from 5 to 8, from 5 to 7, from 5 to 6, from 6 to 10, from 6 to 9, from 6 to 8, from 6 to 7, from 7 to 10, from 7 to 9, from 7 to 8, from 8 to 10, from 8 to 9, or from 9 to 10. The $(NHCH_2CH_2)_x$ moiety of Formula (I) may include cyclic moieties, branched moieties, or combinations of these. Without being bound by any particular theory, it is believed that a greater number of $(NHCH_2CH_2)_x$ moieties may result in a greater reduction in the hydration of the subterranean formation due to a greater concentration of amine moieties in the cement slurry that may interact with the surface of the clay particles.

In one or more embodiments, the polyethylene polyamines have an average molecular weight sufficient to create a film or layer on the surfaces of clay particles present in subterranean formations. In some embodiments, the polyethylene polyamines have an average molecular weight of from 200 g/mol to 400 g/mol. For example, the polyethylene polyamines may have an average molecular weight of from 200 g/mol to 375 g/mol, from 200 g/mol to 350 g/mol, from 200 g/mol to 325 g/mol, from 200 g/mol to 300 g/mol, from 200 g/mol to 275 g/mol, from 200 g/mol to 250 g/mol, from 200 g/mol to 225 g/mol, from 225 g/mol to 400 g/mol, from 225 g/mol to 375 g/mol, from 225 g/mol to 350 g/mol, from 225 g/mol to 325 g/mol, from 225 g/mol to 300 g/mol, from 225 g/mol to 275 g/mol, from 225 g/mol to 250 g/mol, from 250 g/mol to 400 g/mol, from 250 g/mol to 375 g/mol, from 250 g/mol to 350 g/mol, from 250 g/mol to 325 g/mol, from 250 g/mol to 300 g/mol, from 250 g/mol to 275 g/mol, from 275 g/mol to 400 g/mol, from 275 g/mol to 375 g/mol, from 275 g/mol to 350 g/mol, from 275 g/mol to 325 g/mol, from 275 g/mol to 300 g/mol, from 300 g/mol to 400 g/mol, from 300 g/mol to 375 g/mol, from 300 g/mol to 350 g/mol, from 300 g/mol to 325 g/mol, from 325 g/mol to 400 g/mol, from 325 g/mol to 375 g/mol, from 325 g/mol to 350 g/mol, from 350 g/mol to 400 g/mol, from 350 g/mol to 375 g/mol, or from 375 g/mol to 400 g/mol. When the polyethylene polyamines have an average molecular weight less than 200 g/mol, the polyethylene polyamines may not create a film or layer over the entire surface of the clay particles present in the subterranean formation. Without being bound by any particular theory, it is believed that smaller polyethylene polyamines, for example, polyethylene polyamines having an average molecular weight less than 200 g/mol, may not be large enough to adequately cover the entire surface of the clay particles. This may allow interaction between the clay particles and the aqueous fluid of the cement, which may result in the swelling of the clay particles and the hydration of the subterranean formation.

In one or more embodiments the clay stabilizer includes tetraethlyenepentamine, pentaethylenehexamine, hexaethyleneheptamine, or combinations of these. In some embodiments, the weight percent of the tetraethlyenepentamine is at least 10 wt. % of the clay stabilizer. For example, the weight percent of the tetraethlyenepentamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, the weight percent of the pentaethylenehexamine is at least 10 wt. % of the clay stabilizer. For example, the weight percent of the pentaethylenehexamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. In some embodiments, the weight percent of the hexaethyleneheptamine is at least 10 wt. % of the clay stabilizer. For example, the weight percent of the hexaethyleneheptamine may be at least 20 wt. %, at least 30 wt. %, at least 40 wt. %, at least 50 wt. %, at least 60 wt. %, at least 70 wt. %, at least 80 wt. %, or at least 90 wt. % of the clay stabilizer. Tetraethlyenepentamine, pentaethylenehexamine, hexaethyleneheptamine, or combinations of these, may be the majority of the clay stabilizer. In some embodiments, the sum of the weight percent of the tetraethlyenepentamine, pentaethylenehexamine, and hexaethyleneheptamine may be at least 50 wt. % of the clay stabilizer. For example, the sum of the weight percent of the tetraethlyenepentamine, pentaethylenehexamine, and hexaethyleneheptamine may be at least 60 wt. %, at least 70 wt. %, at least 80 wt. %, at least 90 wt. %, at least 95 wt. %, or at least 99 wt. % of the clay stabilizer.

In one or more embodiments, the cement slurry includes the clay stabilizer in an amount sufficient to effectively reduce or prevent the hydration of the subterranean formation. In some embodiments, the cement slurry includes the clay stabilizer in an amount of from 1 wt. % to 10 wt. % relative to the total weight of the cement particles of the cement slurry. For example the cement slurry may include the clay stabilizer in an amount of from 1 wt. % to 9 wt. %, from 1 wt. % to 8 wt. %, from 1 wt. % to 7 wt. %, from 1 wt. % to 6 wt. %, from 1 wt. % to 5 wt. %, from 1 wt. % to 4 wt. %, from 1 wt. % to 3 wt. %, from 1 wt. % to 2 wt. %, from 2 wt. % to 10 wt. %, from 2 wt. % to 9 wt. %, from 2 wt. % to 8 wt. %, from 2 wt. % to 7 wt. %, from 2 wt. % to 6 wt. %, from 2 wt. % to 5 wt. %, from 2 wt. % to 4 wt. %, from 2 wt. % to 3 wt. %, from 3 wt. % to 10 wt. %, from 3 wt. % to 9 wt. %, from 3 wt. % to 8 wt. %, from 3 wt. % to 7 wt. %, from 3 wt. % to 6 wt. %, from 3 wt. % to 5 wt. %, from 3 wt. % to 4 wt. %, from 4 wt. % to 10 wt. %, from 4 wt. % to 9 wt. %, from 4 wt. % to 8 wt. %, from 4 wt. % to 7 wt. %, from 4 wt. % to 6 wt. %, from 4 wt. % to 5 wt. %, from 5 wt. % to 10 wt. %, from 5 wt. % to 9 wt. %, from 5 wt. % to 8 wt. %, from 5 wt. % to 7 wt. %, from 5 wt. % to 6 wt. %, from 6 wt. % to 10 wt. %, from 6 wt. % to 9 wt. %, from 6 wt. % to 8 wt. %, from 6 wt. % to 7 wt. %, from 7 wt. % to 10 wt. %, from 7 wt. % to 9 wt. %, from 7 wt. % to 8 wt. %, from 8 wt. % to 10 wt. %, from 8 wt. % to 9 wt. %, or from 9 wt. % to 10 wt. % relative to the total weight of the cement particles of the cement slurry.

In one or more embodiments, the hydration of the subterranean formation may lead to an increase in fines in the cement slurry, which negatively affect the rheology of the cement slurry. Accordingly, without being bound by any particular theory, it is believed that the effectiveness of a cement slurry at suppressing the hydration of a subterranean formation may be measured by the rheology of the cement slurry. The rheological properties of the cement slurry, such as plastic viscosity, yield point, and gel strength, may be determined from measurements of the viscosity, shear stress, and shear rate of the cement slurry. In some embodiments, the rheological properties of the cement slurry may be determined by measuring the shear stress on the cement slurry at different shear rates. The various shear rates are utilized since cement slurries behave as a rigid body at lesser shear stresses but flow as a viscous fluid at greater shear stresses.

The gel strength of a cement slurry refers to the shear stress of the cement slurry measured at a shear rate less than 10 rpm following a defined period of time during which the cement slurry is maintained in a static state. In some embodiments, the cement slurry may have a gel strength after 10 seconds of from 1 lbf/100 ft$^2$ to 15 lbf/100 ft$^2$. For example, the cement slurry may have a gel strength after 10 seconds of from 1 lbf/100 ft$^2$ to 12 lbf/100 ft$^2$, from 1 lbf/100 ft$^2$ to 9 lbf/100 ft$^2$, from 1 lbf/100 ft$^2$ to 6 lbf/100 ft$^2$, from 1 lbf/100 ft$^2$ to 3 lbf/100 ft$^2$, from 3 lbf/100 ft$^2$ to 15 lbf/100 ft$^2$, from 3 lbf/100 ft$^2$ to 12 lbf/100 ft$^2$, from 3 lbf/100 ft$^2$ to 9 lbf/100 ft$^2$, from 3 lbf/100 ft$^2$ to 6 lbf/100 ft$^2$, from 6 lbf/100 ft$^2$ to 15 lbf/100 ft$^2$, from 6 lbf/100 ft$^2$ to 12 lbf/100 ft$^2$, from 6 lbf/100 ft$^2$ to 9 lbf/100 ft$^2$, from 9 lbf/100 ft$^2$ to 15 lbf/100 ft$^2$, from 9 lbf/100 ft$^2$ to 12 lbf/100 ft$^2$, or from 12 lbf/100 ft$^2$ to 15 lbf/100 ft$^2$. In some embodiments, the clay stabilizer may decrease the 10-second gel strength of the cement slurry when compared to a similar or equivalent cement slurry without the clay stabilizer by greater than or equal to 10%. For example, the clay stabilizer may decrease the 10-second gel strength of the cement slurry when compared to a similar or equivalent cement slurry without the clay stabilizer by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

In embodiments, the cement slurry may have a gel strength after 10 minutes of from 1 lbf/100 ft$^2$ to 25 lbf/100 ft$^2$. For example, the cement slurry may have a gel strength after 10 minutes of from 1 lbf/100 ft$^2$ to 20 lbf/100 ft$^2$, from 1 lbf/100 ft$^2$ to 15 lbf/100 ft$^2$, from 1 lbf/100 ft$^2$ to 10 lbf/100 ft$^2$, from 1 lbf/100 ft$^2$ to 5 lbf/100 ft$^2$, from 5 lbf/100 ft$^2$ to 25 lbf/100 ft$^2$, from 5 lbf/100 ft$^2$ to 20 lbf/100 ft$^2$, from 5 lbf/100 ft$^2$ to 15 lbf/100 ft$^2$, from 5 lbf/100 ft$^2$ to 10 lbf/100 ft$^2$, from 10 lbf/100 ft$^2$ to 25 lbf/100 ft$^2$, from 10 lbf/100 ft$^2$ to 20 lbf/100 ft$^2$, from 10 lbf/100 ft$^2$ to 15 lbf/100 ft$^2$, from 15 lbf/100 ft$^2$ to 25 lbf/100 ft$^2$, from 15 lbf/100 ft$^2$ to 20 lbf/100 ft$^2$, or from 20 lbf/100 ft$^2$ to 25 lbf/100 ft$^2$. In some embodiments, the clay stabilizer may decrease the 10-minute gel strength of the cement slurry when compared to a similar or equivalent cement slurry without the clay stabilizer by greater than or equal to 10%. For example, the clay stabilizer may decrease the 10-minute gel strength of the cement slurry when compared to a similar or equivalent cement slurry without the clay stabilizer by greater than or equal to 20%, greater than or equal to 30%, greater than or equal to 40%, greater than or equal to 50%, greater than or equal to 60%, greater than or equal to 70%, greater than or equal to 80%, greater than or equal to 90%, greater than or equal to 100%, greater than or equal to 200%, greater than or equal to 250%, or greater than or equal to 500%.

In one or more embodiments, the cement slurry may be formulated to have specific characteristics or accomplish specific functions. For example, in some embodiments, the cement slurry may be formulated to achieve a density of from 50 pounds per cubic foot (pcf) to 150 pcf. For example, the cement slurry may be formulated to achieve a density of from 50 pcf to 125 pcf, from 50 pcf to 100 pcf, from 50 pcf to 75 pcf, from 75 pcf to 150 pcf, from 75 pcf to 125 pcf, from 75 pcf to 100 pcf, from 100 pcf to 150 pcf, from 100 pcf to 125 pcf, or from 125 pcf to 150 pcf. To accomplish these functions, the cement slurry may include one or more additives that are suitable for use in cement slurries. The one or more additive may include accelerators, retarders, extenders, suspending agents, weighting agents, fluid loss control agents, lost circulation control agents, surfactants, antifoaming agents, or combinations of these.

As used in the present disclosure, the term "retarder" refers to a chemical agent used to increase the thickening time of cement slurries to enable proper placement of the cement slurry within the wellbore. The need for cement retardation increases with depth of the wellbore due to the greater time required to complete the cementing operation and the effect of increased temperature on the cement-setting process. The term "weighting agent" refers to finely divided solid particles that may be dispersed in the cement slurry. In some embodiments, the weighting agent includes barite, hematite, calcium carbonate, siderite, ilmenite, or combinations of these. The term "fluid loss control agent" refers to materials that reduce or prevent the leakage of the liquid phase of the cement slurry into the subterranean formation, which may result in an undesirable buildup of solid material present in the cement slurry, damage to the subterranean formation, or both. In some embodiments, the fluid loss control agent may include starch, carboxymethyl starch, carboxymethylcellulose, or combinations of these.

As used in the present disclosure, the term "surfactant" (also referred to as "dispersing agent") refers to materials that may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of: reduction of friction pressure when pumping; reduction of water content; and improvement of the performance of fluid loss additives. In some embodiments, the surfactant includes polycarboxylate ether, sulfonated naphthalene formaldehyde condensate, sulfonated acetone formaldehyde condensate, sulfonated polymers, polystyrene sulfonate, malamide, or combinations of these. Sulfonated polymers may include aliphatic sulfonated polymers, aromatic sulfonated polymers, heteroaromatic sulfonated polymers, and combinations of these. In some embodiments, the surfactant includes one or more anionic groups. For instance, the dispersing agent may include synthetic sulfonated polymers, lignosulfonates with carboxylate groups, organic acids, hydroxylated sugars, or combinations of these. In some embodiments, the surfactant includes at least one of anionic surfactants, cationic surfactants, amphoteric surfactants, zwitterionic surfactants, nonionic surfactants, or combinations of these.

In one or more embodiments, the cement slurry includes the one or more additives in an amount of from 0.1 wt. % to 10 wt. % relative to the total weight of the cement particles of the cement slurry. For example the cement slurry may include the mixture of polyethylene polyamines in an amount of from 0.1 wt. % to 8 wt. %, from 0.1 wt. % to 6 wt. %, from 0.1 wt. % to 4 wt. %, from 0.1 wt. % to 2 wt. %, from 2 wt. % to 10 wt. %, from 2 wt. % to 8 wt. %, from 2 wt. % to 6 wt. %, from 2 wt. % to 4 wt. %, from 4 wt. % to 10 wt. %, from 4 wt. % to 8 wt. %, from 4 wt. % to 6 wt. %, from 6 wt. % to 10 wt. %, from 6 wt. % to 8 wt. %, or from 8 wt. % to 10 wt. % relative to the total weight of the cement particles of the cement slurry.

The present disclosure is also directed to the use of the cement slurry in drilling operations, such as cementing a casing in a wellbore. In one or more embodiments, the method may include pumping the cement slurry into a location to be cemented and curing the modified cement slurry by allowing the water and the cement particles to react. The location to be cemented may, for instance, be a well, a wellbore, or an annulus.

Figures 1, 2:
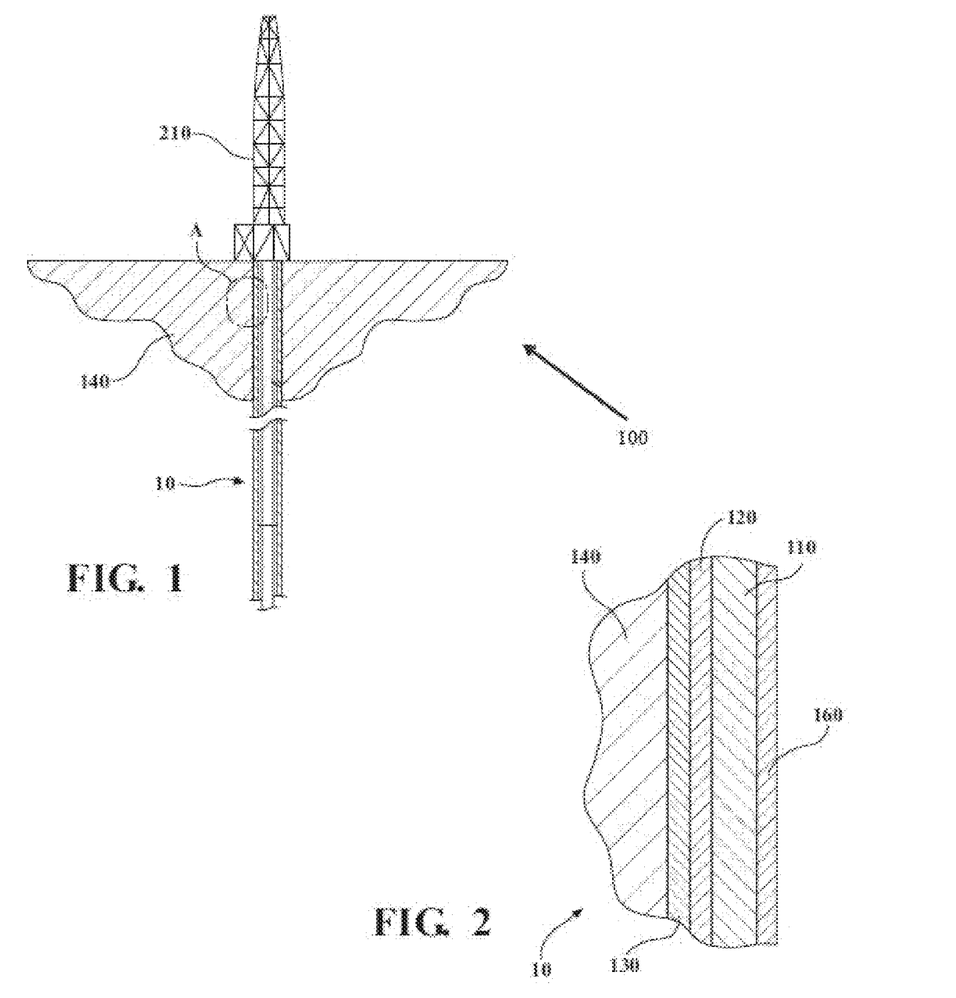
FIG. 1 schematically depicts a view of an oil and gas platform, according to one or more aspects of the present disclosure.
FIG. 2 schematically depicts a view from the side of a wellbore, according to one or more aspects of the present disclosure.

Referring now to FIG. 1, an oil and gas platform 210 may be positioned over a wellbore 10 formed in a subterranean formation 140. The wellbore 10 may serve to connect natural resources, such as petrochemical products, to a ground level surface platform 210. A wellbore casing 160 may be inserted into the wellbore 10. The wellbore casing 160 may be a pipe or other tubular structure that has a diameter less than that of the wellbore 10. Generally, the wellbore casing may be lowered into the wellbore 10 such that the bottom of the wellbore casing 160 reaches to a region near the bottom of the wellbore 10.

Now referring to FIG. 2, which graphically depicts an embodiment of the wellbore 10 at inset A shown in FIG. 1, the wellbore casing 160 may be cemented by inserting a cement slurry into the annular region between the outer edge of the wellbore casing 160 and the edge of the wellbore 10 formed in the subsurface formation 140. This cement slurry will form a cement layer 110. The cement slurry may be inserted into the annular region by pumping the cement slurry into the interior portion of the wellbore casing 160, to the bottom of the wellbore casing 160, around the bottom of the wellbore casing 160, into the annular region, or a combination of some or all of these. In preparing a well for cementing, it is important to establish the amount of cement required for the job. This may be done by measuring the diameter of the borehole along its depth, using a caliper log. Utilizing both mechanical and sonic means, multi-finger caliper logs measure the diameter of the well at numerous locations simultaneously in order to accommodate for irregularities in the wellbore diameter and determine the volume of the openhole. Additionally, the required physical properties of the cement are essential before commencing cementing operations. The proper set cement is also determined, including the density and viscosity of the material, before actually pumping the cement into the hole.

The cement slurry may displace drilling fluid, pushing it to the top of the well. In some embodiments, a spacer fluid may be used as a buffer between the cement slurry and the drilling fluid by displacing and removing the drilling fluid before the cement slurry is pumped into the well to prevent contact between the drilling fluid and the cement slurry. Following the insertion of an appropriate amount of cement slurry into the interior region of the wellbore casing, in some embodiments, a displacement fluid may be utilized to push the cement slurry out of the interior region of the wellbore casing 160 and into the annular region. This displacement may cause the entirety of the spacer fluid and drilling fluid to be removed from the annular region, out the top of the wellbore. The cement slurry may then be cured or otherwise allowed to harden to form the cement layer 110. The cement layer 110 thus formed is disposed between the wellbore casing 160 and the subsurface formation 140. The cement layer 110 isolates the wellbore casing 160 from the subsurface formation 140.

In one or more embodiments, the method includes pumping the cement slurry into an annulus between a casing and a wellbore and curing the cement slurry. The cement slurry may be in accordance with any of the embodiments previously described. As used in the present disclosure, the term "curing" refers to providing adequate moisture, temperature and time to allow the concrete to achieve the desired properties (such as hardness) for its intended use through one or more reactions between the water and the cement particles. In some embodiments, curing the cement slurry may refer to passively allowing time to pass under suitable conditions upon which the cement slurry may harden or cure through allowing one or more reactions between the water and the cement particles. Suitable conditions may be any time, temperature, pressure, humidity, and other appropriate conditions known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the cement particles, or a combination of these. Usually, the cement will be cured and convert from liquid to solid due to subsurface formation conditions, temperature, and pressure.

In one or more embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., greater than or equal to 120° F., or greater than or equal to 180° F. The cement slurry may be cured at temperatures of from 50° F. to 250° F., or from 50° F. to 200° F., or from 50° F. to 150° F., or from 50° F. to 120° F., or from 50° F. to 180° F. In some instances, the temperature may be as great as 200° F., 300° F., 400° F., or 500° F. The cement slurry may be cured at pressures of greater than or equal to 20 psi, greater than or equal to 200 psi, greater than or equal to 500 psi, greater than or equal to 1000 psi, greater than or equal to 2000 psi, or greater than or equal to 3000 psi. The cement slurry may be cured at pressures of from 20 psi to 5000 psi, or from 200 psi to 5000 psi, or from 200 psi to 3000 psi, or from 500 psi to 2000 psi, or from 500 psi to 3000 psi. In some instances, the pressure may be as great as 1000 psi, 2000 psi, 3000 psi, 5000 psi, or 10000 psi. The cement slurry may be cured for from 1 day to 14 days, such as from 3 to 14 days, or from 5 to 14 days, or from 7 to 14 days, or from 1 to 4 days, or from 4 to 7 days.

As stated previously, cementing is performed when the modified cement slurry is deployed into the well via pumps, displacing the drilling fluids still located within the well, and replacing them with cement. The modified cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

In one or more embodiments, the silicates phase in the cured cement may be about 75-80 wt. % of the total material. $Ca_3O_5Si$ is the major constituent, with concentration as great as 60-65 wt. %. The quantity of $Ca_2SiO_4$ conventionally does not exceed 20 wt. %, 30 wt. %, or 40 wt. %. The hydration products for $Ca_3O_5Si$ and $Ca_2SiO_4$ are calcium silicate hydrate ($Ca_2H_2O_5Si$) and calcium hydroxide (Ca(OH)$_2$), also known as Portlandite. The calcium silicate hydrate commonly called CSH gel has a variable C:S and H:S ratio depending on the temperature, calcium concentration in the aqueous phase, and the curing time. The CSH gel comprises +/−70 wt. % of fully hydrated Portland cement at ambient conditions and is considered the principal binder of hardened cement. Upon contact with water, the gypsum may partially dissolve releasing calcium and sulphate ions to react with the aluminate and hydroxyl ions produced by the C3A to form a calcium trisulphoaluminate hydrate, known as the mineral ettringite ($Ca_6Al_2(SO_4)_3(OH)_{12}.26H_2O$) that will precipitate onto the $Ca_3O_5Si$ surfaces preventing further rapid hydration (flash-set). The gypsum is gradually consumed and ettringite continues to precipitate until all the gypsum is consumed. The sulphates ion concentration will reduce and the ettringite will become unstable converting to calcium monosulphoaluminate hydrate ($Ca_4Al_2O_6(SO_4)$.14H$_2$O). The remaining unhydrated $Ca_3O_5Si$ will form calcium aluminate hydrate. Cement slurry design is based on the altering or inhibition of the hydration reactions with specific additives.

EXAMPLES

The various aspects of the present disclosure will be further clarified by the following examples. The examples are illustrative in nature and should not be understood to limit the subject matter of the present disclosure.

Example 1

In Example 1, a dispersion recovery test was performed. First, a filter medium (325 mesh screen) was placed in the bottom of the cell of a fluid loss test apparatus (commercially available as Model 7120 from Chandler Engineering) at room temperature (approximately 27° C.). A cement slurry consisting of 355 grams of water, 3 drops of defoamer, and 800 grams of Class G Portland cement particles was then placed in the cell, which was then pressurized up to 1,000 psi. A valve was then opened at the bottom of the cell and the liquid that exited the cell over a duration of 30 minutes was collected.

Next, two samples of the fluid collected from the cell (that is, cement filtrate) were prepared: a control sample and one that included 15 grams of a mixture of polyethylene polyamines. The mixture of polyethylene polyamines incorporated into the sample was ETHYLENEAMINE E-100 (commercially available from Huntsman). ETHYLENEAMINE E-100 is a mixture of polyethylene polyamines having an average molecular weight of 250 g/mol to 300 g/mol. Both samples (350 mL) were then mixed with shale cuttings (20 g). After mixing, the samples were both hot rolled at 66° C. and 25 rpm for 16 hours. After hot rolling, the shale cuttings were sieved from the samples using No. 35 mesh and then washed thoroughly to remove any small shale particles. The shale cuttings remaining on the sieve were then desiccated at 105° C. for 24 hours before being weighed. The recovery was then calculated using the following equation:

$$\text{Shale Dispersion Recovery} = W_c/30 \times 100 \qquad \text{Equation (I)}$$

Where $W_c$ is the weight of the shale cuttings remaining on the sieve after desiccation. The results are reported in Table 1.

TABLE 1

| Sample | Weight After Hot Rolling (g) | Dispersion Recovery (%) |
|---|---|---|
| Initial Shale Cuttings | 30 | — |
| Sample 1 (Conventional Cement Filtrate) | 0.091 | 0.30 |
| Sample 2 (Cement Filtrate w/ Polyethylene Polyamines) | 12.952 | 43.17 |

Example 2

In Example 2, two different cement slurry samples were prepared. The first sample (Comparative Sample A) included only 355 grams of water, 3 drops of defoamer, and 800 grams of cement particles. The second sample (Sample 1) was prepared by mixing 355 grams of water, 3 drops of defoamer, 15 grams of ETHYELNE E100, and 800 grams of cement particles. It should be noted that the cement particles were Class G Portland cement particles. It should be further noted that the specific defoamer used should not have an effect on the rheology of the cement slurry samples so long as it is suitable for use with cement slurries. After preparing the samples, the rheology of both samples was measured at room temperature (RT) using a viscometer (commercially available as Model 35 from Fann Instrument Company). The composition and rheology of each sample are listed in Table 2.

TABLE 2

| | Comparative Sample A | Sample 1 |
|---|---|---|
| Composition | | |
| Water (g) | 355 | 355 |
| Defoamer (drops) | 3 | 3 |
| Mixture of Polyethylene Polyamines (g) | — | 15 |
| Cement Particles (g) | 800 | 800 |
| Rheology | | |
| 300 rpm | 82 | 96 |
| 200 rpm | 71 | 81 |
| 100 rpm | 53 | 62 |
| 60 rpm | 45 | 57 |
| 30 rpm | 39 | 51 |
| 6 rpm | 14 | 19 |
| 3 rpm | 11 | 17 |
| 10-Second Gel Strength (lb$_f$/100 ft$^2$) | 14 | 14 |
| 10-Minute Gel Strength (lb$_f$/100 ft$^2$) | 25 | 19 |

It will be apparent to persons of ordinary skill in the art that various modifications and variations can be made without departing from the scope of the present disclosure. Since modifications, combinations, sub-combinations, and variations of the disclosed embodiments, which incorporate the spirit and substance of the present disclosure, may occur to persons of ordinary skill in the art, the scope of the present disclosure should be construed to include everything within the scope of the appended claims and their equivalents.

According to a first aspect of the present disclosure, a cement slurry includes cement particles, an aqueous fluid in an amount of from 10 wt. % to 70 wt. % relative to the total weight of the cement particles, and a clay stabilizer consisting of one or more polyethylene polyamines having a first structure $H_2NCH_2CH_2(NHCH_2CH_2)_xNH_2$, where x is an integer greater than or equal to 3. The amount of the clay stabilizer may be from 1 wt. % to 10 wt. % relative to the total weight of the cement particles. The average molecular weight of the polyethylene polyamines in the cement slurry having the first chemical structure may be from 200 g/mol to 400 g/mol. All of the polyethylene polyamines in the cement slurry having the first chemical structure may be encompassed in the clay stabilizer.

A second aspect of the present disclosure may include the first aspect, where the cement particles include Portland cement, siliceous fly ash, calcareous fly ash, slag cement, silica fume, quartz, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, or combinations of these.

A third aspect of the present disclosure may include either one of the first and second aspects, where the polyethylene polyamines having the first structure include linear polyethylene polyamines, cyclic polyethylene polyamines, branched polyethylene polyamines, or combinations of these.

A fourth aspect of the present disclosure may include any one of the first through third aspects, where the polyethylene polyamines having the first structure include tetraethlyenepentamine, pentaethylenehexamine, hexaethyleneheptamine, or combinations of these.

A fifth aspect of the present disclosure may include the fourth aspect, where the sum of the weight percent of the tetraethylenepentamine, pentaethylenehexamine, and hexaethyleneheptamine is at least 50 wt. % of the polyethylene polyamines having the first structure.

A sixth aspect of the present disclosure may include any one of the first through fifth aspects, further including one or more additives selected from accelerators, retarders, extenders, suspending agents, weighting agents, fluid loss control agents, lost circulation control agents, surfactants, and antifoaming agents.

A seventh aspect of the present disclosure may include the sixth aspect, where the cement slurry includes the one or more additives in an amount of from 0.1 wt. % to 10 wt. % relative to the total weight of the cement particles.

An eighth aspect of the present disclosure may include any one of the first through seventh aspects, where the cement slurry has a gel strength after 10 seconds of from 1 lbf/100 ft$^2$ to 15 lbf/100 ft$^2$.

A ninth aspect of the present disclosure may include any one of the first through eighth aspects, where the cement slurry has a gel strength after 10 minutes of from 1 lbf/100 ft$^2$ to 25 lbf/100 ft$^2$.

A tenth aspect of the present disclosure may include any one of the first through ninth aspects, where the cement slurry has a density of from 50 pcf to 150 pcf.

According to an eleventh aspect of the present disclosure, a method for cementing a casing in a wellbore includes pumping a cement slurry into an annulus between the casing and the wellbore, and curing the cement slurry. The cement slurry may be the cement slurry of any one of the first through tenth aspects.

It should now be understood that various aspects of the present disclosure are described and such aspects may be utilized in conjunction with various other aspects.

It is noted that any two quantitative values assigned to a property may constitute a range of that property, and all combinations of ranges formed from all stated quantitative values of a given property are contemplated in this disclosure.

Having described the subject matter of the present disclosure in detail and by reference to specific aspects, it is noted that the various details of such aspects should not be taken to imply that these details are essential components of the aspects. Rather, the appended claims should be taken as the sole representation of the breadth of the present disclosure and the corresponding scope of the various aspects described in the present disclosure.

What is claimed is:

1. A cement slurry comprising:
   cement particles;
   an aqueous fluid in an amount of from 10 wt. % to 70 wt. % relative to the total weight of the cement particles; and
   a clay stabilizer consisting of a mixture of polyethylene polyamines, where the polyethylene polyamines of the mixture have a structure $H_2NCH_2CH_2(NHCH_2CH_2)_xNH_2$, where x is an integer greater than or equal to 3, wherein:
   the amount of the clay stabilizer is from 1 wt. % to 10 wt. % relative to the total weight of the cement particles;
   the average molecular weight of the mixture of polyethylene polyamines in the cement slurry having the structure is from 200 g/mol to 400 g/mol; and
   all of the polyethylene polyamines in the cement slurry having the structure are encompassed in the clay stabilizer.

2. The cement slurry of claim 1, wherein the cement particles comprise Portland cement, siliceous fly ash, calcareous fly ash, slag cement, silica fume, quartz, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, or combinations of these.

3. The cement slurry of claim 1, wherein the polyethylene polyamines having the structure comprise linear polyethylene polyamines, cyclic polyethylene polyamines, branched polyethylene polyamines, or combinations of these.

4. The cement slurry of claim 1, wherein the polyethylene polyamines having the structure comprise tetraethylenepentamine, pentaethylenehexamine, hexaethyleneheptamine, or combinations of these.

5. The cement slurry of claim 4, wherein the sum of the weight percent of the tetraethylenepentamine, pentaethylenehexamine, and hexaethyleneheptamine is at least 50 wt. % of the mixture of polyethylene polyamines having the structure.

6. The cement slurry of claim 1, further comprising one or more additives selected from accelerators, retarders, extenders, suspending agents, weighting agents, fluid loss control agents, lost circulation control agents, surfactants, and antifoaming agents.

7. The cement slurry of claim 6, wherein the cement slurry comprises the one or more additives in an amount of from 0.1 wt. % to 10 wt. % relative to the total weight of the cement particles.

8. The cement slurry of claim 1, wherein the cement slurry has a gel strength after 10 seconds of from 1 lbf/100 ft$^2$ to 15 lbf/100 ft$^2$.

9. The cement slurry of claim 1, wherein the cement slurry has a gel strength after 10 minutes of from 1 lbf/100 ft$^2$ to 25 lbf/100 ft$^2$.

10. The cement slurry of claim 1, wherein the cement slurry has a density of from 50 pcf to 150 pcf.

11. A method for cementing a casing in a wellbore, the method comprising:
    pumping a cement slurry into an annulus between the casing and the wellbore; and
    curing the cement slurry;
    where the cement slurry comprises:
    cement particles;
    an aqueous fluid in an amount of from 10 wt. % to 70 wt. % relative to the total weight of the cement particles; and
    a clay stabilizer consisting of a mixture of polyethylene polyamines, where the polyethylene polyamines of the mixture have a structure $H_2NCH_2CH_2(NHCH_2CH_2)_xNH_2$, where x is an integer greater than or equal to 3, wherein:
    the amount of the clay stabilizer is from 1 wt. % to 10 wt. % relative to the total weight of the cement particles;
    the average molecular weight of the mixture of polyethylene polyamines in the cement slurry having the structure is from 200 g/mol to 400 g/mol; and
    all of the polyethylene polyamines in the cement slurry having the structure are encompassed in the clay stabilizer.

12. The method of claim 11, wherein the cement particles comprise Portland cement, siliceous fly ash, calcareous fly ash, slag cement, silica fume, quartz, calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, trivalent chromium, calcium aluminate, silica sand, silica flour, hematite, manganese tetroxide, or combinations of these.

13. The method of claim 11, wherein the polyethylene polyamines having the structure comprise linear polyethylene polyamines, cyclic polyethylene polyamines, branched polyethylene polyamines, or combinations of these.

14. The method of claim 11, wherein the polyethylene polyamines having the structure comprise tetraethylenepentamine, pentaethylenehexamine, hexaethyleneheptamine, or combinations of these.

15. The method of claim 14, wherein the sum of the weight percent of the tetraethylenepentamine, pentaethylenehexamine, and hexaethyleneheptamine is at least 50 wt. % of the mixture of polyethylene polyamines having the structure.

16. The method of claim 11, wherein the cement slurry further comprises one or more additives selected from accelerators, retarders, extenders, suspending agents, weighting agents, fluid loss control agents, lost circulation control agents, surfactants, and antifoaming agents.

17. The method of claim 16, wherein the cement slurry comprises the one or more additives in an amount of from 0.1 wt. % to 10 wt. % relative to the total weight of the cement particles.

18. The method of claim 11, wherein the cement slurry has a gel strength after 10 seconds of from 1 lbf/100 ft$^2$ to 15 lbf/100 ft$^2$.

19. The method of claim 11, wherein the cement slurry has a gel strength after 10 minutes of from 1 lbf/100 ft$^2$ to 25 lbf/100 ft$^2$.

20. The method of claim 11, wherein the cement slurry has a density of from 50 pcf to 150 pcf.

* * * * *